J. T. BAILEY.
TOPS FOR FURNITURE.

No. 187,344. Patented Feb. 13, 1877.

Witnesses:

Inventor:
James T. Bailey.
by John A. Wiedersheim
Attorney.

UNITED STATES PATENT OFFICE.

JAMES T. BAILEY, OF PHILADELPHIA, PENNSYLVANIA.

IMPROVEMENT IN TOPS FOR FURNITURE.

Specification forming part of Letters Patent No. 187,344, dated February 13, 1877; application filed December 14, 1876.

*To all whom it may concern:*

Be it known that I, JAMES T. BAILEY, of the city and county of Philadelphia and State of Pennsylvania, have invented a new and useful Improvement in Furniture Tops, &c., which improvement is fully set forth in the following specification and accompanying drawings, in which—

Figure 1:
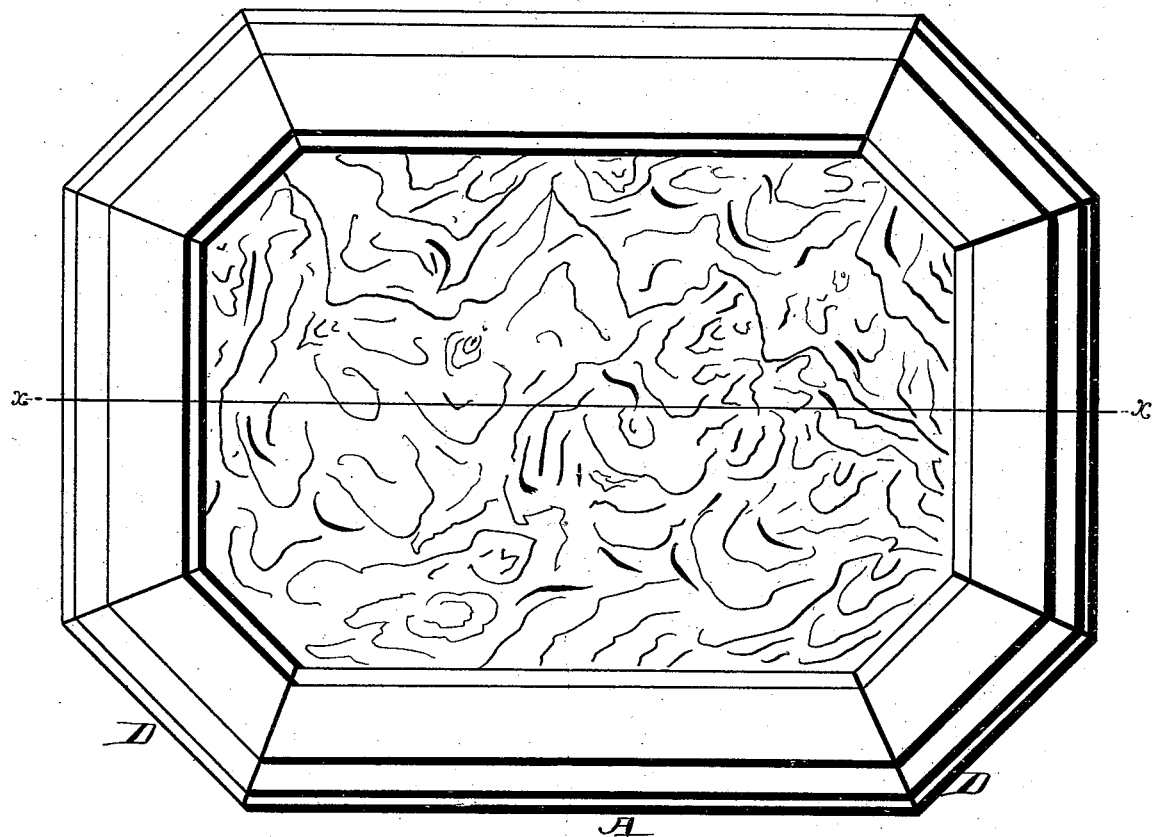
Figure 2:
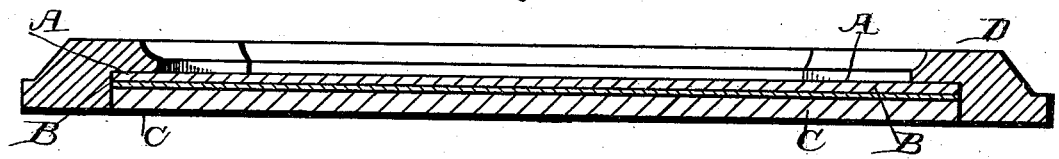

Figure 1 is a face view. Fig. 2 is a section thereof in line $x\ x$.

Similar letters of reference indicate corresponding parts in the two figures.

My invention consists of a furniture top or panel formed of a glass surface, with an under facing of paper, printed or otherwise, marked in imitation of marble, whereby designs of great variety and beauty may be produced at small cost, the materials being within convenient reach, thus facilitating the manufacture. Applied to the under facing is a backing for protecting the under facing, assisting to secure the glass surface and under facing in position, and imparting the proper density and strength to the top.

Referring to the drawings, A represents a plate of glass, which is to form the surface of the top, and to the under side thereof there is applied a sheet, B, of paper or fabric, whose upper face is printed or otherwise produced in imitation of veined, variegated, mottled, or other configured or plain marble, said face imparting to the glass the appearance of a solid mass of marble of the configuration or appearance of the sheet B.

It will be seen that designs of great variety and beauty may be produced, the cost thereof being small, and, as the materials are within convenient reach, the manufacture will be greatly facilitated.

Against the under side of the sheet B there is laid a mass, C, of cement, or other suitable backing, thus protecting said sheet, assisting to secure the glass surface and under facing in position, and imparting the proper density and strength to the top. D represents a rim for inclosing the parts so as to protect their edges, admit of handling, and impart the finish to the top.

Having thus described my invention, what I claim as new, and desire to secure by Letters Patent, is—

1. The glass surface A, under facing sheet B in imitation of marble, and backing C, combined and operating substantially as and for the purpose set forth.

2. The glass surface A, under facing in imitation of marble, sheet B, backing C, and rim D, combined and operating substantially as and for the purpose set forth.

JAMES T. BAILEY.

Witnesses:
JOHN A. WIEDERSHEIM,
H. E. HINDMARSH.